Nov. 28, 1967  W. B. HOWE ET AL  3,354,821
TANDEM PRINTER CONTROL

Filed April 15, 1964  5 Sheets-Sheet 1

INVENTOR
WARREN B. HOWE
WILLIAM KYLE
BY *Russell L. Root*
ATTORNEY

Nov. 28, 1967 W. B. HOWE ETAL 3,354,821
TANDEM PRINTER CONTROL

Filed April 15, 1964 5 Sheets-Sheet 3

INVENTOR.
WARREN B. HOWE
WILLIAM KYLE
BY
Russell L. Root
ATTORNEY.

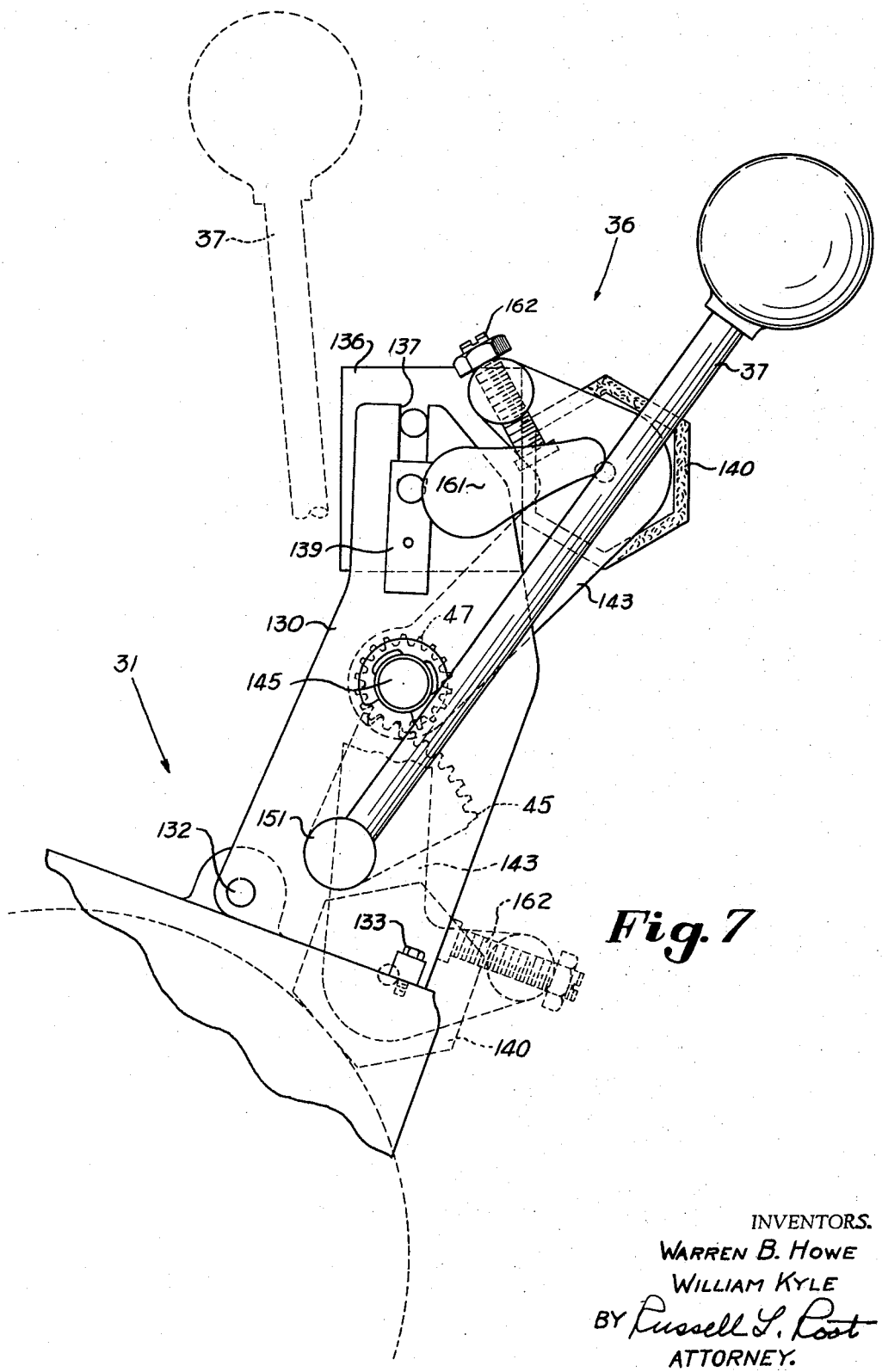

United States Patent Office 3,354,821
Patented Nov. 28, 1967

3,354,821
TANDEM PRINTER CONTROL

Warren B. Howe and William Kyle, Euclid, Ohio, assignors to Addressograph-Multigraph Corporation, Cleveland, Ohio, a corporation of Delaware
Filed Apr. 15, 1964, Ser. No. 360,051
4 Claims. (Cl. 101—142)

This invention relates to a new and improved printing machine and more particularly to an offset printing machine of the kind comprising first and second printing heads connected in tandem and driven in unison to perform two sequential printing operations on each of a plurality of print-receiving sheets. The printing machine of the invention includes provision for controlling virtually all machine operations by automatic sequence control apparatus incorporated in the machine, with little or no attention from the machine operator once printing has been initiated.

In Patent No. 3,056,346 to Gammeter et al., issued October 2, 1962, there is disclosed an offset printing machine particularly suitable for applications requiring frequent changes of the material being printed. Machines of this kind are often applied to relatively short printing runs, sometimes referred as as "systems" printing applications. In the offset printing machine disclosed in the aforesaid Patent No. 3,056,346, the principal control is exercised by a main control member that is movable between an initial position, two intermediate operating positions, and a final printing position. This control member, usually constituting a rotatable shaft, controls the application of ink-repellent solution to a planographic master mounted upon the master cylinder of the machine and also controls the application of ink to that master. In addition, the control shaft, by its movement between its different operating positions, controls the displacement of one of the master and blanket cylinders of the machine from an initial position displaced from the other cylinder into blanket-imaging contact therewith, thereby controlling imaging of the blanket. The same control shaft also is used to control a blanket cleaner for cleaning ink from the blanket cylinder of the machine in preparation for a new printing operation.

In some systems applications, it is essential to provide for printing both sides of a sheet in order to condense the total volume of paper required for a given amount of printed data. It is frequently desirable to use the printing machine to prepare a printed form and at the same time to imprint specific data in the form outline. Moreover, it is frequently desirable to print the same sheet in more than one color. In each of these instances, it is necessary to afford more than one printing head in order to achieve the requisite versatility and capacity in the printing machine. In an automatically controlled tandem printing machine, however, it is not desirable to maintain the two printing heads of the machine in complete synchronism with each other, insofar as the sequence of operational steps is concerned, particularly because this may lead to over-inking of the blanket in the second printing head of the machine. The means for controlling the heads of the machine in proper time with each other is disclosed in detail in the copending application of Burger and Polly, S.N. 359,934, filed substantially concurrently herewith and assigned to our common assignee.

It is a primary object of the present invention to provide manually operable means for applying plate-etch to the masters on both printing heads simultaneously. Means has previously been devised for applying plate-etch to the master on a single head, which means is illustrated in detail in the patent to Janke, No. 2,798,426.

While this arrangement can, of course, be applied to both heads of a tandem machine, it has been found that in systems applications where the operator must operate the handles frequently at short intervals, either one handle is operated at a time with unacceptable delay in the operation, or if an attempt to operate both handles simultaneously is made, the operator finds the arrangement very awkward and experiences undue fatigue.

It is another object of the invention, therefore, to provide an arrangement wherein the manually operated plate-etch equipment is provided, but in which it is so arranged as to be simultaneously operable on both heads without fatiguing the operator.

Other objects, features and advantages will appear as the description proceeds.

In the drawings:

FIG. 2A is an illustration of the FIGURE 2 control levers and means for applying plate-etch solution in the manually actuated position;

FIG. 7 is a view similar to FIG. 3, but showing the first printing head in FIG. 1 and especially the plate-etch applicator used thereon.

Figure 1:
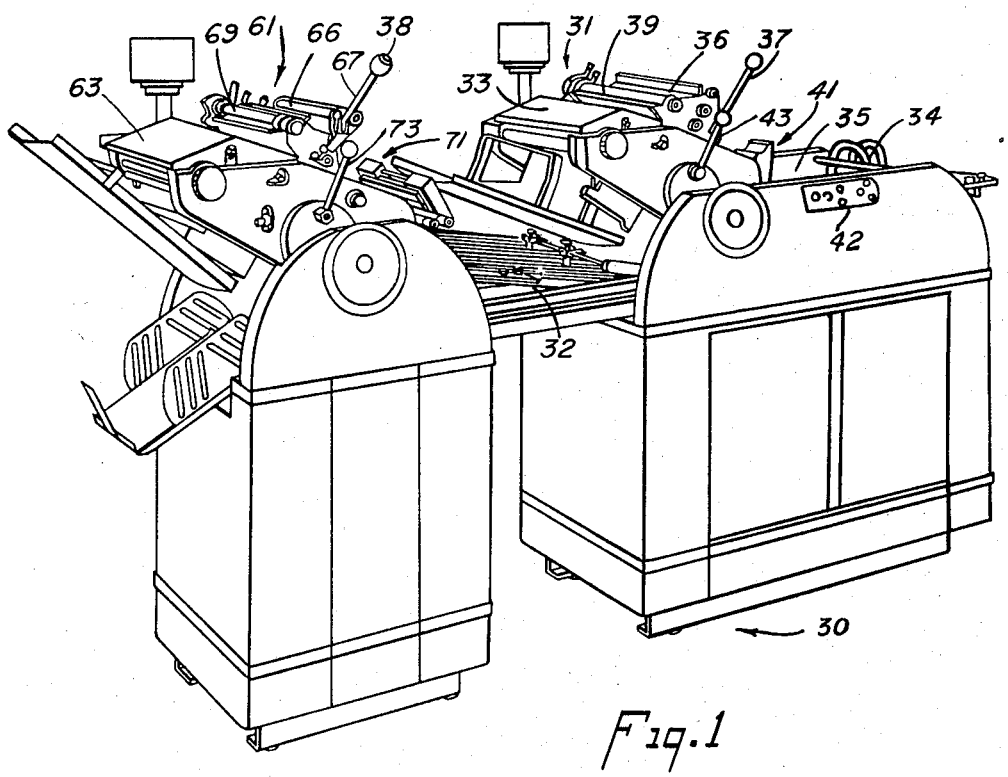
FIG. 1 is a perspective view of a dual offset printing machine constructed in accordance with a preferred embodiment of the invention.

A general understanding of the construction and operation of the printing machine of the invention may best be obtained by reference to FIG. 1, in which a printing machine 30 constructed in accordance with a preferred embodiment of the invention is illustrated in perspective. As shown therein, the printing machine 30 is a dual offset printing machine or duplicating machine which in many respects is conventional in construction. Thus, the printing machine 30 comprises a first printing head 31 which includes the usual master cylinder upon which a conventional lithographic or other planographic master may be mounted. The printing head 31 further includes a blanket cylinder and an impression cylinder (the cylinders are not visible in FIGURE 1) which may be of conventional construction. An inking mechanism generally indicated by the reference numeral 33 is incorporated in the printing head 31 and is utilized to apply ink to a lithographic master mounted upon the master cylinder of the machine. In the course of a printing operation, ink is applied to the master, transferred to the blanket cylinder, and printed upon a sheet of paper or the like which is passed between the blanket and impression cylinders of the printing head 31.

The paper feed mechanism 34 of the printing machine 30 is located at the right-hand end of the machine, as seen in FIGURE 1. Preferably, the paper feed mechanism is of the vacuum type and is utilized to feed individual sheets of paper or the like from a stack or supply included in the paper feed mechanism. The paper feed may include an apparatus for elevating the stack of paper, as sheets are fed therefrom. The sheet feeder 34 is connected to the printing head 31 by a conveyor table 35 which may be of conventional construction and which may include suitable jogging or other aligning devices for assuring accurate alignment of the sheets of paper as they enter the printing head 31.

In addition to the main operating cylinders and the inking apparatus 33, the printing head 31 includes certain additional operating devices which are directly employed in the printing process. Thus, the head 31 also includes a manually controlled plate-etch applicator 36 which is utilized to apply an etching solution to the planographic master on the master cylinder in printing head 31 during the initial stages of a printing run. Operation of the plate-etch applicator 36 is controlled by an operating lever or handle 37.

As in most printing machines using planographic masters, it is necessary to apply a repellent solution to the master cylinder during the course of normal operation. For this purpose, the printing head 31 is provided with a repellent applicator 39. The device 39 affords a means for applying a repellent solution to the master cylinder, in a course of a printing operation, and for interrupting the supply of repellent solution during an automatically controlled sequence of operations.

The initial printing head 31 further includes an automatically controlled blanket cleaner 41 which is mounted upon the frame of the printing head 31 in position to engage the blanket cylinder of the first printing head. The blanket cleaner 41 is utilized to remove ink from the blanket, between individual printing operations, to permit a change in the data being printed without requiring removal of the blanket cylinder or the blanket from the printing head 31.

Primary control of the printing machine 30 is effected by means of a series of switches and other control devices mounted upon a control panel 42 on the side of the machine. Additional control is provided by manual controls, such as the plate etch control handle 37 and others, as described in detail hereinafter. In particular, a main control handle 43 for head 31 may be utilized to control a major portion of the machine operation whenever the automatic electrical control system of the machine is not employed. When the machine is set for automatic control, a counter is utilized to determine the length of a given printing run.

Figure 2:
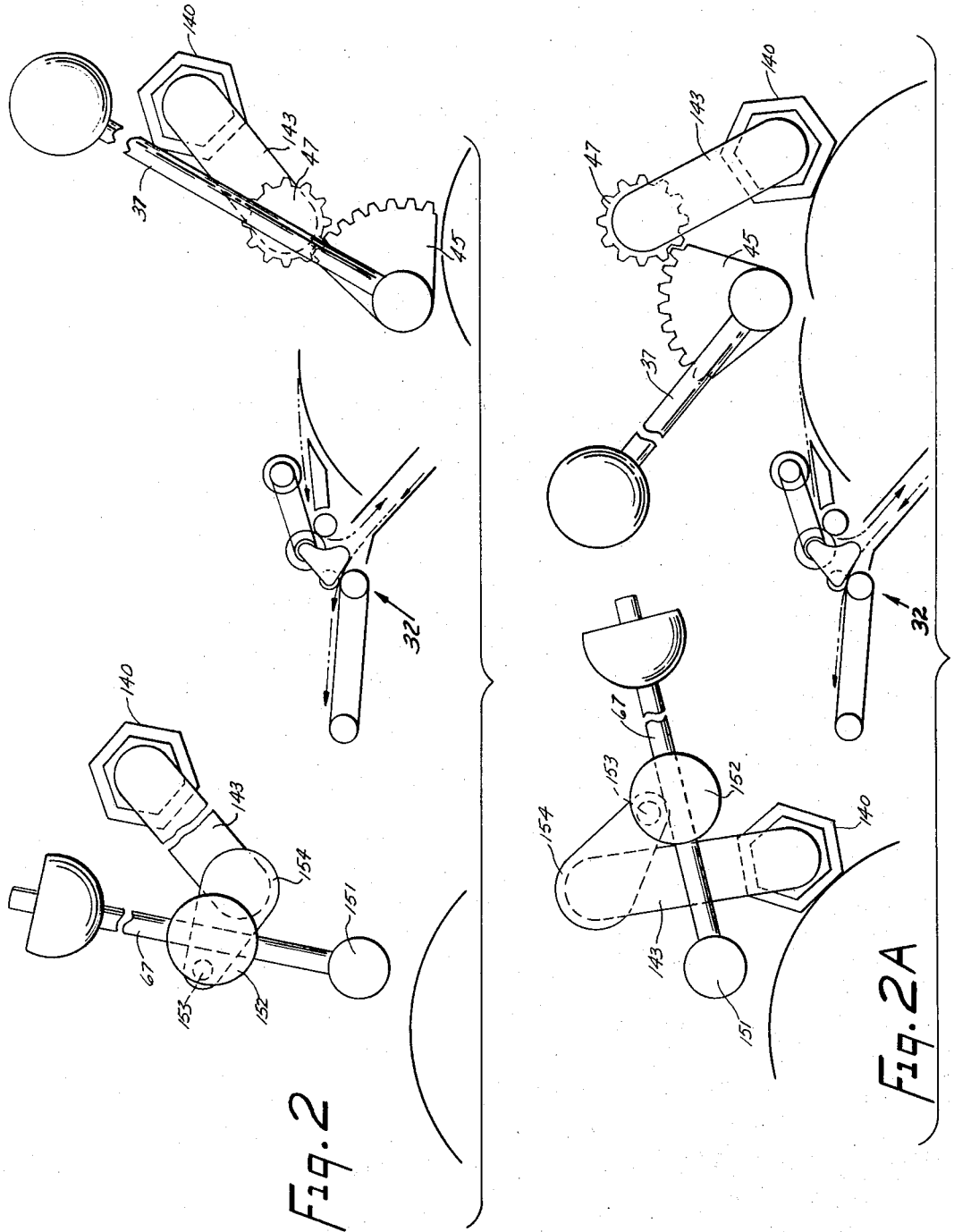
FIG. 2 is a schematic illustration of the relationship of the two control levers for the means used to apply plate-etch solution to a master on two tandem position planographic printing heads, and illustrating schematically a means for taking a sheet printed by a first head and feeding it to the second head; the levers being illustrated in their inactive position.

The printed sheets from head 31 are transported along a conveyor 32 to a second printing head 61. Conveyor 32, in addition to transporting the sheets between the two printing heads, turns each sheet over so that head 61 prints on the reverse side of the sheet. The turn-over conveyor is described in Patent No. 2,625,101 to H. F. Gammeter, issued January 13, 1953, to which reference may be made for the conveyor construction and operation. FIGURES 2 and 2A, which are provided as schematic illustrations, indicate the spaced relationship of the printing heads 31 and 61 because of the requirement of space to contain the conveyor 32. In FIGURES 2 and 2A, the conveyor is out of proportion to the schematic illustration of the manual operating handles, and is also physically misplaced with respect to actual operating machinery as shown in FIGURE 1. The conveyor is below the master cylinders which are served by the handles 37 and 67. The physical requirement of the two tandem machines and the conveyor 32 is such that the operating levers 37 and 67 must be spaced a distance apart.

The second printing head 61 of machine 30 is in most respects a substantial duplicate of the first head 31. It includes the usual master cylinder, blanket cylinder, and impression cylinder (not visible in the drawing). An inking mechanism 63 is provided for inking a master on the master cylinder. There is a plate-etch applicator 66 which is of the type shown in detail in the patent to Janke, noter above, and which is controlled by an operating lever or handle 67 that is provided with a normally open control switch 38. Control switch 38 is designed, when closed by pressure of the operator's finger, to complete a holding circuit which initiates and continues rotation of the cylinders of the printing heads in a known manner. Repellent solution is applied by means of a repellent applicator 69 and an automated blanket cleaner 71 is provided to clean the blanket of printing head 61. A main control handle 73 is provided for manual control of the principal machine operations, other than plate etch application.

Figure 3:
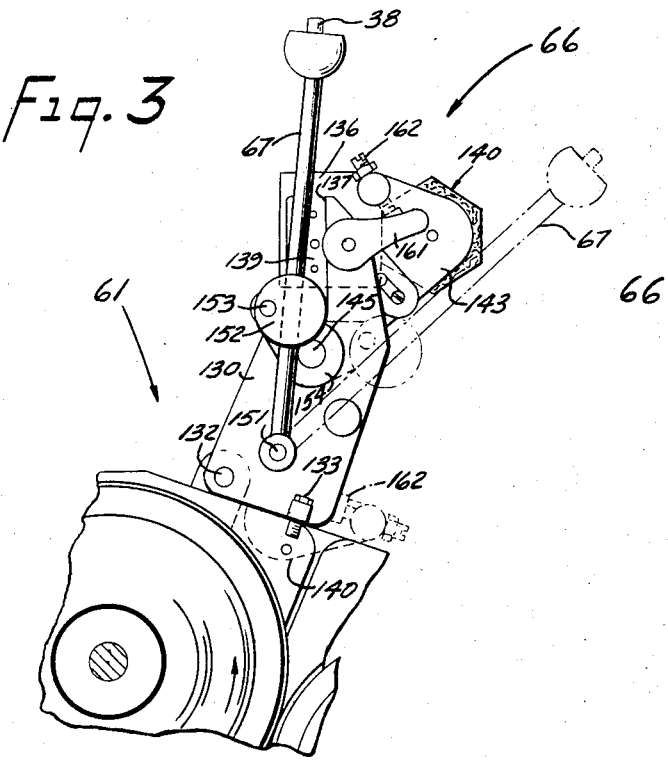
FIG. 3 is a partial side view of the second printing head of FIG. 1 with parts broken away, especially illustrating the plate-etch applicator.
Figure 5:
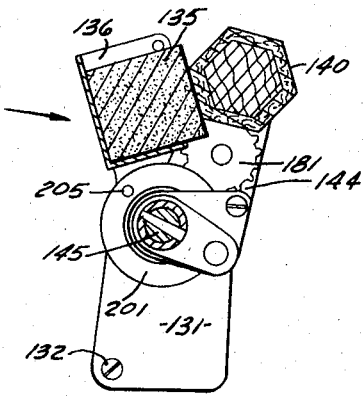
FIG. 5 is a section taken substantially on line 5—5 of FIG. 4.
Figure 4:
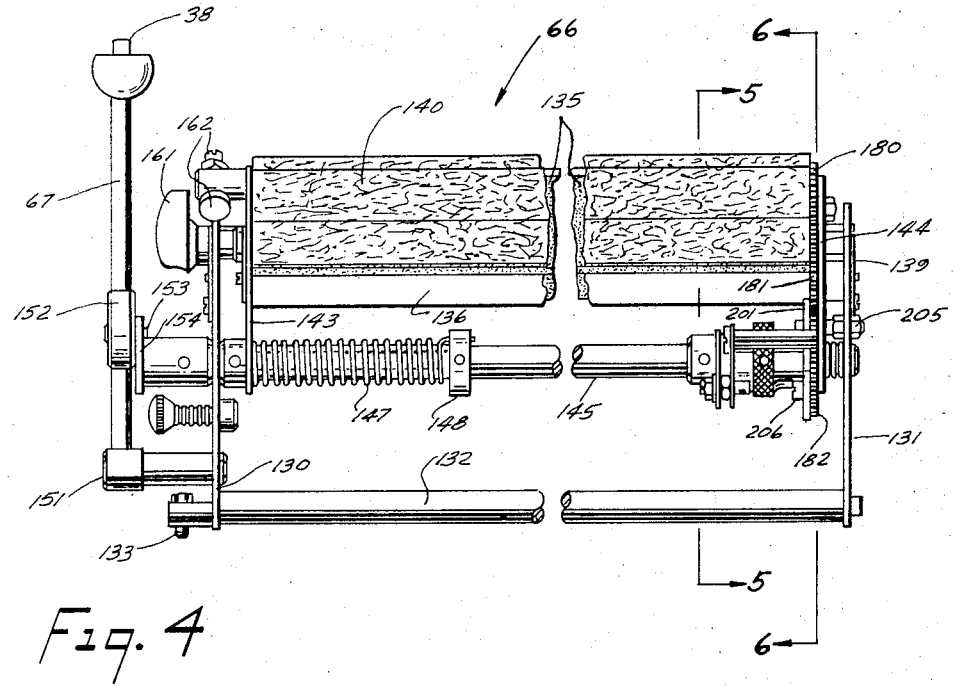
FIG. 4 is an elevation of the plate-etch applicator looking from the right in FIG. 3.
Figure 6:
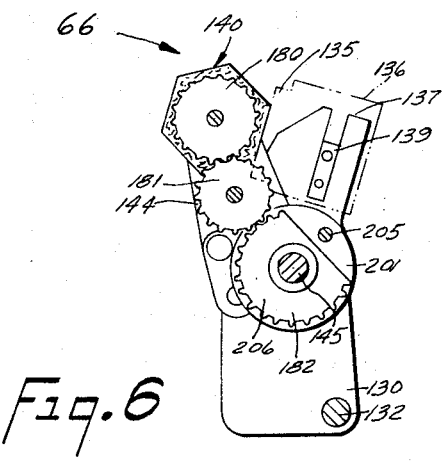
FIG. 6 is a section taken substantially on line 6—6 of FIG. 4.

The plate etch applicator 66 is substantially identical with the one shown in the Janke patent cited above, and embodies a pair of side plates 130 and 131 which are secured together and spaced by cross frame members such as for instance the rod 132. The frame plates are arranged to be secured to the side frame members of the printing or duplicating machine, as, for instance by bolts, one of which is indicated in FIGS. 3 and 4 at 133. A supply of liquid repellent is carried in an elongated sponge-like absorbent member 135 which is mounted in a trough-like receptacle 136 removably supported between the upper ends of the side plates 130 and 131. As indicated in FIG. 6, the side plates 130 and 131 are each provided with a vertically extending open-ended slot 137 to receive lugs which project outward from the ends of the receptacle 136. Spring retaining members 139 mounted on the respective frame plates are provided to removably retain the receptacle in position in the applicator frame.

The sponge-like member 135 is of a type which may be saturated with a liquid ink repellent and which will transfer the liquid to an absorbent surfaced transfer member 140. The transfer member 140 comprises an elongated substantially non-absorbent body covered with an outer layer of absorbent material. The transfer member 140 is mounted in the upper ends of a pair of spaced arms 143 and 144, the lower ends of which are pivoted for movement about the axis of a supporting rod 145 with which they are drivingly connected and which is journaled in the side plates 130 and 131.

The transfer member 140 is swingable from its normal position, in which it is in contact wtih the sponge-like member 135, as shown in full lines in the drawings, into wiping contact with the surface of the rotating printing plate. The member 140 is retained in its normal position by a torsion spring 147 encircling the rod 145 and having one end secured to a collar 148 fixed to the rod and its other end secured to the adjacent side plate 130.

The transfer member 140 is manually swung into operating contact with the printing plate by the manipulation of the hand lever 67. One end of this lever, as shown in FIG. 1, is pivoted to the exterior of the side plate 130 as at 151. A disc 152 is slidably mounted for movement axially of the lever 67 and is provided with a pin 153 which engages an arm 154 drivingly secured to the rod 145 (FIGS. 3 and 4). The rocking movement of the hand lever 67 is transmitted to the rod 145 and to the arms 143 and 144 which are drivingly secured thereto. The driving connection between the lever 67 and the arm 154 and the pivotal connections of the lever 67 and rod 145 with the end plates 130 and 131 are so related one to the other that the angular travel of the arms 143 and 144 about the axis of the rod 145 is much greater than the angular travel of the hand lever 67 about its pivotal connection 151 with the side plate 130, thereby bringing the transfer member down into contact with a plate on the printing cylinder.

When not in use the absorbent transfer member 140 may be held out of contact with the supply member or sponge 135 by a cam 160 rotatably mounted in the side plate 130 and provided with a manually operable handle 161.

The pressure of the transfer member 140 against the printing plate may be limited by an adjustable member such as for instance the adjusting screw 162 shown in FIGS. 3 and 4.

The same area of the transfer member 140 which contacts the supply member 135 is the area which is brought into contact with the printing plate when the transfer member is swung into its plate contacting position. In the embodiment illustrated, this is accomplished by mounting the transfer member in its supporting arms 143 and 144 for rotation about its own axis and by positively rotating such member a predetermined amount as it is swung into plate contacting position so that the face which was in contact with the supply will be substantially tangential to the printing plate when such position is reached.

The rotation of the transfer member 140 about its axis is accomplished by means of a train of gears 180, 181 and 182. The gear 180 is mounted on the arm 144 for rotation about the axis of the transfer member 140, and is drivingly connected with such member. The gear 182 is mounted on the rod 145 in the same vertical plane as the gear 180 and is constrained against rotation relative to the side frame plate 131 as will hereinafter become more apparent. The gear 181 is rotatably mounted on the arm 144 intermediate and in engagement with the gears 180 and 182. Accordingly, rotation of the rod 145 in response to the operation of the hand lever 167 will rotate the transfer member 140 about its own axis.

The gear 182 is rotatably mounted on the rod 145 between the arm 144, which is fixed to the sleeve, and a plate 201 which is rotatably on the rod 145 but which is constrained against rotary movement by a pin 205 carried by the side plate 131 and projecting through a suitable opening formed in the plate. The gear 182 is adjustably secured to the plate 201 by a clamping bolt 206 which is threaded in the gear and passes through a slot 207 formed in the plate.

While the plate-etch applicator 66 is substantially identical with the one shown in the Janke patent, in that a clockwise motion of handle 67 will operate the device, the plate-etch applicator 36 is slightly different. In the case of applicator 36 the driving connection with the handle 37 has been changed so that counter clockwise motion will operate the device. Various mechanisms are, of course, available to produce this result, perhaps the simplest of which is merely to introduce a pair of meshing spur gears in the drive train between the handle and the mechanism. This arrangement is illustrated in FIG. 7 which shows the plate etch applicator on the first head 31 of the machine. It will be understood that the basic structure of the applicator is the same as that shown in FIGS. 3 to 6, the only differecne being that the drive connection 152, 153, 154 between the operating lever and the rod 145 is replaced by a gear sector 45 and a meshing pinion 47. The gear sector 45 is drivingly connected with the operating lever 37 at its pivot point 151, and is located against the inner face of the frame memebr 130. The pinion 47 is drivingly affixed to the shaft 145 in a position to mesh with the sector 45. Thus, when the operating lever 37 is moved in an anticlockwise direction, the applicator 140 is moved from its rest position into contact with the surface of a plate on the printing cylinder in a path parallel to that traversed by the applicator 140 of the second head 61 and in the same direction along said path.

While the control switch 38 has been shown as being mounted in handle 67, it will be understood that this can be provided in handle 37 instead if desired, or there may be one in each handle. In some cases it may in fact prove preferable to provide the switch 38 in handle 37 so that it is conveniently available in case the head 31 is the only one being used for the type of work in progress.

When conditioned for automatic operation, the printing machine 30 carries out a predetermined sequence of operations based upon a very limited number of control steps performed by the machine operator. Assuming that there is an adequate supply of paper in the storage stack of the feeder 34, the operator sets the counter of the machine to print a predetermined number of sheets fed into the machine from the feeder. Thereafter, the machine operator starts the printing machine 30 in operation by actuating the switch 38 in one of the plate-etch applicator handles. At the same time, the operator pivots the plate-etch control handles 37 and 67 from their respective normal or "off" positions, shown in FIGURE 1, to initiate operation of the plate etch applicators 36 and 66. Handle 37 is pivoted counterclockwise; handle 67 is moved clockwise. Plate etching is a manually controlled operation in both printing heads of the machine 30, and the number of machine cycles required to apply an etching solution to the planographic masters on the master cylinders mounted in the two printing heads is left to discretion of the machine operator.

After the plate etching operation, the operator releases the handles 37 and 67, which return to their initial positions as shown in FIGURE 1. When the handle 67 reaches its "home" position, it actuates a control switch which is effective to initiate automatic sequential operation of the printing machine 30, the sequence of automatic operations being illustrated in the timing chart, FIGURE 2. The automatic control system of the printing machine first operates to initiate application of repellent solution to the planographic masters mounted upon the master cylinders in printing heads 31 and 61. That is, the repellent solution applicators 39 and 69, which previously had not been effective to apply repellent to the masters, are actuated in the initial stage of automatic operation and are each effective to apply a repellent solution to the associated planographic master.

The next automatically controlled operation is the inking of the masters. The final form rolls of the ink trains comprising the inking systems 33 and 63 are brought into contact with the masters in printing heads 31 and 61 after the repellent solution applicators 39 and 69 have been in operation for one machine cycle. However, it should be understood that this sequence of operations may be varied to some extent, and that two or more cycles may elapse, after the repellent applicators have been actuated and before inking of the masters is initiated.

After the masters have been inked for several machine cycles, imaging of the blanket in printing head 31 is initiated. This and the other steps in operation of the machine 30, are accomplished automatically by the control system described in the copending application previously mentioned.

From the foregoing description it can be seen that we have provided a control mechanism for a dual head tandem printing machine, so arranged that an operator can actuate the plate-etch applicator control handles in a speedy, effective and comfortable manner, even though the heads are significantly spaced, as by a sheet turnover conveyor 32.

While preferred embodiments of the invention have been described and illustrated, it is to be understood that these are capable of variation and modification. Accordingly, the aim in the appended claims is to cover all such variations and modifications as may fall within the true spirit of the invention.

Wht is claimed is:

1. In a system duplicating machine a first planographic printing head including a rotary cylinder means for carrying a replaceable master, a second planographic printing head arranged in tandem with the first head and including a rotary cylinder means for carrying a replaceable master; means for taking a sheet printed by said first head and feeding it to the second head; means for applying plate-etch solution to a master on said first head by movement in a predetermined direction; means for applying plate-etch solution to a master on said second head by movement in the same direction along a path parallel to the movement of said first-named applying means; a manually pivotable control lever for each of said applying means on the respective head; and drive means for transmitting control from each control lever to its applying means for moving each said applying means from an inoperative position into contact with its respective master when the control lever on its head is moved towards the other head, and for withdrawing each said applying means from contact with its respective master when moved away from the other head, one said drive means having direction reversing means in said transmitting control for producing the same direction of movement in said applying means from opposite control lever travel.

2. A system duplicating machine as defined in claim 1, further characterized by means actuable by the operator without removing his hands from said levers for initiating rotary operation of the cylinders of both of said heads.

3. A device as set forth in claim 2 in which said last named means includes electrical control means for starting rotation of the cylinders of both of said heads; and a switch associated with one of said levers for activating said electrical control means.

4. In a systems duplicating machine a first planographic printing head including a rotary cylinder means for carrying a replaceable master, a second planographic printing head arranged in tandem with the first head and including a rotary cylinder means for carrying a replaceable master, a sheet inverting feed between said heads for taking a sheet printed by the first head, turning it over, and feeding it to the second head; a pivot centered swinging arm applicator for applying plate-etch solution to a master on said first head by rotary movement in a predetermined direction; a pivot centered swinging arm applicator for applying plate-etch solution to a master on said second head by rotary movement in the same direction along a path parallel to the movement of said first-named applicator means, each applicator being effective on the same side of the respective cylinder means; a manually pivotable control lever for each of said applicators on the respective head, and drive means for transmitting control from each control lever to its applicator for moving each said applicator from an inoperative position into contact with its respective master when the control lever on its head is moved towards the other head, and for withdrawing each said applicator from contact with its respective master when moved away from the other head, one said drive means having direction reversing gear means in said transmitting control for producing the same direction of movement in said applicator from opposite control lever travel.

References Cited

UNITED STATES PATENTS

| | | | |
|---|---|---|---|
| 1,273,544 | 7/1918 | Scott | 101—137 |
| 2,545,836 | 3/1951 | Allrecht | 101—137 |
| 2,625,101 | 1/1953 | Gammeter | 101—230 |
| 2,798,426 | 7/1957 | Janke et al. | 101—147 |
| 3,056,346 | 10/1962 | Gammeter et al. | 101—144 |

EUGENE R. CAPOZIO, *Primary Examiner.*